United States Patent [19]
Brewer

[11] 3,789,797
[45] Feb. 5, 1974

[54] CAT LITTER
[75] Inventor: Andrew I. Brewer, Los Angeles, Calif.
[73] Assignee: Star-Kist Foods, Inc., Terminal Island, Calif.
[22] Filed: Nov. 12, 1971
[21] Appl. No.: 198,112

[52] U.S. Cl. ............................ 119/1, 71/21, 71/26, 71/64 DA
[51] Int. Cl. .............................................. C05f 5/00
[58] Field of Search ...... 252/427; 71/15, 20, 21, 23, 71/26, 64 DA; 119/1

[56] References Cited
UNITED STATES PATENTS
3,286,691  11/1966  McFadden ............................ 119/1
3,353,949  11/1967  Nau ...................................... 71/26 X Primary Examiner—Louis G. Mancene
Assistant Examiner—J. A. Oliff
Attorney, Agent, or Firm—Fulwider, Patton, Rieber, Lee & Utecht

[57] ABSTRACT

An animal litter prepared from a mixture of alfalfa, bentonite and a binder for absorbing and neutralizing the odors of animal waste matter.

11 Claims, 1 Drawing Figure

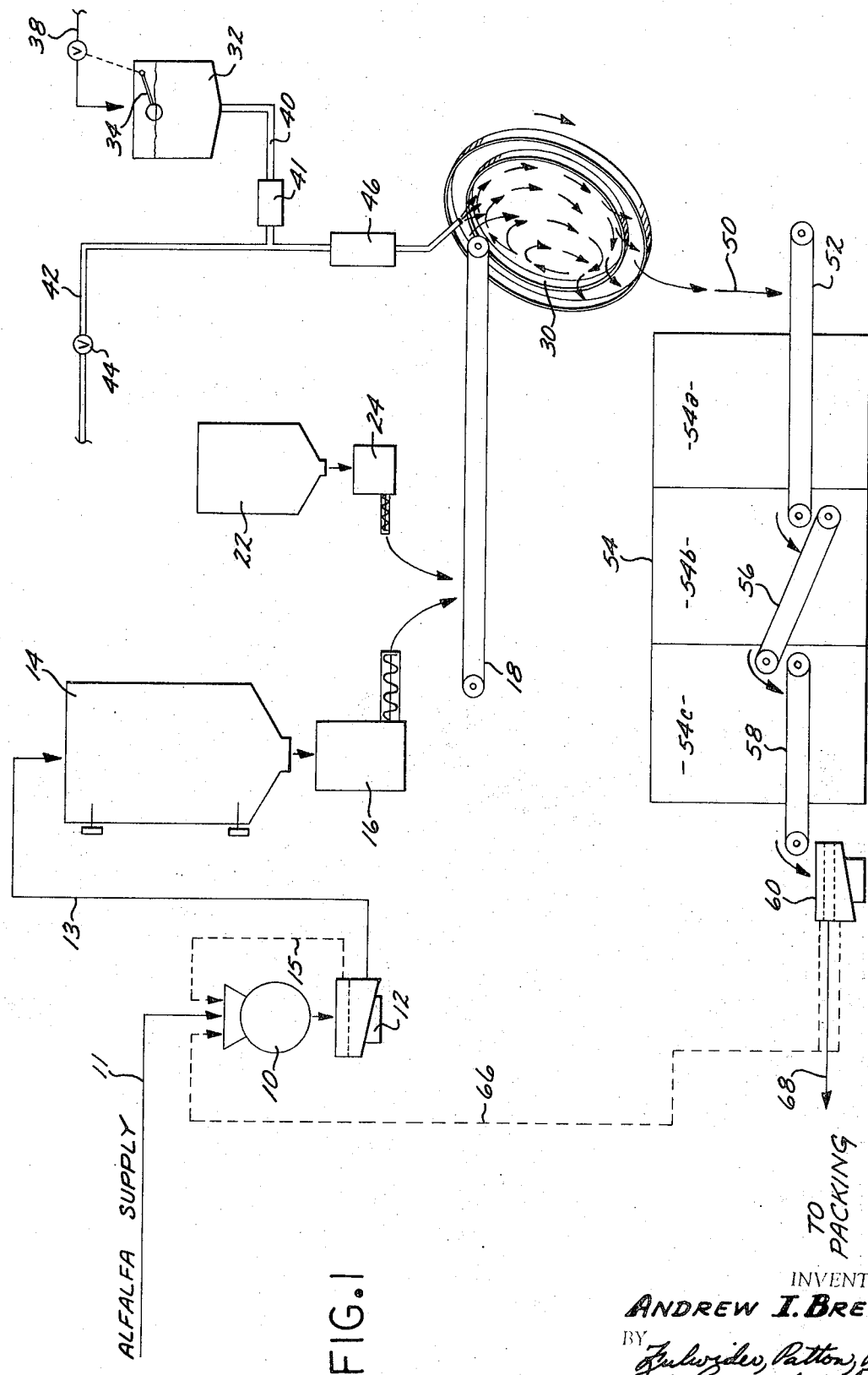

CAT LITTER

BACKGROUND OF THE INVENTION

Animal litter prepared particularly for household pets have been marketed for many years. A widely utilized type of animal litter employs light-weight material generally of clay and/or fiberous products. Such material, however, tends to adhere to the paws or fur of the animal and accordingly is tracked from the litter area to the surrounding household area. Moreover, such animal litter products generally have no provision for neutralizing or eliminating the unpleasant odors inherent to animal waste. Where such animal litter is formed of clay, the comparatively high weight thereof results in expensive shipping costs. Other animal litter products have been developed utilizing chlorophyll-containing agents. Such animal litter generally provides effective odor control by means of the chlorophyll, however, this type of litter is prone to being tracked throughout the house by the animals. Applicant is aware of U.S. Letters Patent No. 3,286,691 and U.S. Letters Patent No. 3,425,397 directed to chlorophyll-containing animal litter.

SUMMARY OF THE INVENTION

The present invention relates to an animal litter prepared by mixing ground and screened alfalfa with bentonite and the resulting mixture with a binder, thereafter pelletizing the mixture of alfalfa, bentonite and binder, and finally drying the pellets produced by such pelletizing. The alfalfa contains chlorophyll which provides effective odor control of animal waste. By mixing and pelletizing the mixture of alfalfa, bentonite and binder, and thereafter drying such pellets, an animal litter is provided which is not readily tracked from the litter area to the other parts of the house.

Other objects and advantages of the present invention will become apparent from a consideration of the following description, when taken in conjunction with the accompanying drawing.

BRIEF DESCRIPTION OF THE DRAWING

FIG. 1 is a diagrammatic view showing a preferred form of method and apparatus for making animal litter embodying the present invention.

DESCRIPTION OF THE INVENTION

Referring to the upper left-hand portion of FIG. 1, there is shown at 10 the representation of a grinder for receiving a supply of alfalfa indicated by directional line 11 to be ground into fine particles which may be termed granulated alfalfa powder. The grinder 10 may be of conventional construction and the details of its construction are not important with respect to the present invention. From the grinder 10, ground alfalfa drops into a conventional screening device 12. The screening device 12 may also be of conventional construction. Preferably, the alfalfa should be screened through at least a 50 mesh screen, although a finer mesh could be utilized.

As indicated by directional line 13 the screened alfalfa is moved from screen 12 to a holding bin 14. Optionally, alfalfa which is too coarse to fall through a screen 12 is returned to grinder 10, as indicated by directional line 15. The provision of holding bin 14 is optional, however, it is desirable since it affords a steady flow of alfalfa. From the holding bin 14, the ground and screened alfalfa is moved by means of a conveyor 16, which may be of the screw type, onto the upper run of a conveyor belt 18. The conveyor belt 18 concurrently receives bentonite from a bin 22 by means of a screw conveyor 24.

The bentonite is mixed with the alfalfa in a ratio of from about 2 percent to 50 percent by weight. Generally, a ratio of 2 percent to 3 percent of bentonite to alfalfa provides excellent results. intersects Conveyor belt 18 moves the mixture of alfalfa and bentonite into a pelletizing device 30. Concurrently, with the deposit of alfalfa and bentonite within the confines of the pelletizer 30 the latter receives a supply of a suitable binder for the alfalfa and bentonite. Such binder may take the form of a molasses, wood molasses, modified starches or a non-toxic glue. The binder is initially contained within a tank 32 provided with a conventional float valve device 34 that controls the flow of binder into the tank from a supply source 38. A pipe 40 leads from tank 32 and a meter 41 is disposed therein. The binder from tank 32 is mixed with water entering through a second pipe 42 that intersecte pipe 40. A valve 44 is disposed in pipe 42. The water and binder flow through a mixer 46 before entering pelletizer 30. The ratio of water to binder may be approximately 90 percent water to 10 percent binder. The moisture level of the mixture of alfalfa and bentonite is raised on the pelletizer 30 to approximately 50 percent to 60 percent by the addition of the water and binder.

Preferably, the pelletizer 30 is of the type known as a Dravo-Lurgi pelletizer sold by Dravo Corporation, Neville Island, Pittsburgh, Pa. Such a device utilizes a pelletizing disc which is rotates about an inclined axis. During rotation of the disc its upper surface receives material to be pelletized. The rotation of the disc of pelletizer 30 produces a tumbling action of the alfalfa, bentonite, molasses and water deposited thereon lifting such material until the gravity of the material overcomes the centrifugal force and the particles of the material gradually are enlarged so as to "snowball" into pellets of the desired size. During this pelletizing the mixture of water and molasses acts as an adhesive to cause the alfalfa particles to snowball together to form the resulting pellets.

As indicated by the directional arrows 50, pellets from pelletizer 30 drop onto the upper run of a second conveyor belt 52. Conveyor belt 52 moves the pellets into one end of a three-stage dryer 54 of conventional construction, the stages being designated 54$^a$, 54$^b$ and 54$^c$. Conveyor belts 56 and 58 move the pellets through the dryer at a rate which affords a generally uniform heat rise which reduces the moisture content to 6–10 percent.

From dryer 54 the dried pellets are dropped by conveyor belt 58 into a second screening device 60 of conventional construction. The second screening device separates the large and the fines from the pellets and such large and fines are then returned to the grinder 10 by suitable means, as indicated by directional line 66. Pellets of the desired predetermined size pass from screening device 60 to a packing means, as indicated by the directional line 68.

The resulting pellets provide an animal litter that neutralizes or eliminates the unpleasant odors inherent to animal waste because of the chlorophyll contained in the alfalfa. The bentonite provides the pellets with firmness and because such animal litter is pelletized it is not readily tracked by animals. Such animal litter also is light in weight so as to permit it to be shipped at comparatively low cost. The resulting litter also may be flushed down a toilet so as to be readily disposable. Alternatively, such litter after being spent, may be employed as a lawn or garden fertilizer. It should be particularly noted that where molasses it utilized as a binder it enhances the odor control characteristic of the animal litter. It should also be noted that the litter produced by the aforedescribed process may be extended by mixing it with crushed corn cobs, perlite, a combination thereof of other suitable materials.

Various other modifications and changes may be made with respect to the foregoing detailed description without departing from the spirit of the present invention.

I claim:

1. A method of preparing an animal litter, comprising the steps of:
   grinding alfalfa to form an alfalfa powder;
   screening said powder;
   mixing said ground and screened alfalfa powder; with bentonite to form a loose moistened mixture;
   then tumbling the particles of said mixture to cause the particles in said mixture to snowball together in a noncompacted state; and
   drying the noncompacted snowballed pellets formed by said tumbling.

2. A method as set forth in claim 1 wherein said tumbling is effected by depositing the particles of alfalfa and bentonite on a rotating surface whereby said particles snowball into balls.

3. A method as set forth in claim 1 that includes the step of adding a moistened binder to said powder.

4. A method as set forth in claim 3 wherein said binder is molasses.

5. A method as set forth in claim 3 wherein the moisuture level of alfalfa and bentonite relative to the moistened binder is raised during said tumbling to about 50 percent to 60 percent.

6. A method as set forth in claim 2 wherein the bentonite is mixed with the alfalfa in a ratio of about 2 percent to 3 percent by weight.

7. A method as set forth in claim 4 wherein the bentonite is mixed with the alfalfa in a ratio of about 2 percent to 3 percent by weight.

8. A method as set forth in claim 1 wherein the bentonite is mixed with the alfalfa in a ratio of about 2 to 3 percent by weight.

9. A method as set forth in claim 3 wherein the moisture level of alfalfa and bentonite relative to the moisture binder is raised during said tumbling to about 50 to 60 percent.

10. A method as set forth in claim 9 wherein said binder is molasses.

11. A method as set forth in claim 2 that includes the steps of adding molasses to said powder.

* * * * *